US011089101B2

(12) United States Patent
Kistler et al.

(10) Patent No.: US 11,089,101 B2
(45) Date of Patent: Aug. 10, 2021

(54) MEDIA CONTENT MANAGEMENT DEVICE

(71) Applicant: Western Digital Technologies, Inc., San Jose, CA (US)

(72) Inventors: Thomas Kistler, Palo Alto, CA (US); Christopher Hansen Bourdon, San Francisco, CA (US); Dmitri Trembovestki, Mountain View, CA (US); James Chia Ho Chou, San Francisco, CA (US); Laurent Baumann, Campbell, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 67 days.

(21) Appl. No.: 15/853,785

(22) Filed: Dec. 23, 2017

(65) Prior Publication Data

US 2018/0191827 A1  Jul. 5, 2018

Related U.S. Application Data

(60) Provisional application No. 62/441,733, filed on Jan. 3, 2017.

(51) Int. Cl.
*H04L 29/08* (2006.01)
*H04W 84/12* (2009.01)
*H04W 88/02* (2009.01)

(52) U.S. Cl.
CPC .......... *H04L 67/1097* (2013.01); *H04L 67/06* (2013.01); *H04L 67/1095* (2013.01);
(Continued)

(58) Field of Classification Search
CPC combination set(s) only.
See application file for complete search history.

(56) References Cited

U.S. PATENT DOCUMENTS

2012/0089781 A1* 4/2012 Ranade ............... G06F 16/1744
711/118
2014/0156791 A1* 6/2014 Sant ................... G06Q 30/0603
709/217
(Continued)

FOREIGN PATENT DOCUMENTS

CN          1577318 A    2/2005
CN        103401902 A   11/2013

OTHER PUBLICATIONS

International Search Report and Written Opinion for PCT/US2017/068379 dated Mar. 7, 2018.
(Continued)

*Primary Examiner* — Nicholas R Taylor
*Assistant Examiner* — Michael Li
(74) *Attorney, Agent, or Firm* — Chang & Hale LLP

(57) ABSTRACT

A media content management device includes one or more memory devices storing instructions, and one or more processors configured to execute the instructions to perform steps of a method for providing management of media content. The device may receive media content from a data source and determine a set of media operations that can be performed by the device on a locally stored copy of the media content on the storage means or by a cloud storage system on a remotely stored copy. Based on whether the cloud storage system is reachable, a first media operation may be performed on the remotely stored copy of the media content or on the locally stored copy of the media content. The device may open a communication path with a user device and transmit a portion of the media content to the user device before uploading to the cloud storage system is complete.

17 Claims, 8 Drawing Sheets

(52) U.S. Cl.
CPC ......... *H04L 67/2842* (2013.01); *H04W 84/12* (2013.01); *H04W 88/02* (2013.01)

(56) References Cited

U.S. PATENT DOCUMENTS

| | | | |
|---|---|---|---|
| 2015/0012488 A1* | 1/2015 | van Rossum | G06F 11/00 707/611 |
| 2015/0207837 A1* | 7/2015 | Guerrera | G11B 27/031 709/203 |
| 2016/0100279 A1* | 4/2016 | Christmas | H04L 67/06 455/41.2 |
| 2016/0246766 A1 | 8/2016 | Feess | |
| 2018/0183855 A1* | 6/2018 | Sabella | H04L 67/04 |

OTHER PUBLICATIONS

International Preliminary Report of Patentability for PCT/US2017/068379 dated Jul. 9, 2019.

Office Action for Chinese patent application 2017800779686, dated May 28, 2021.

* cited by examiner

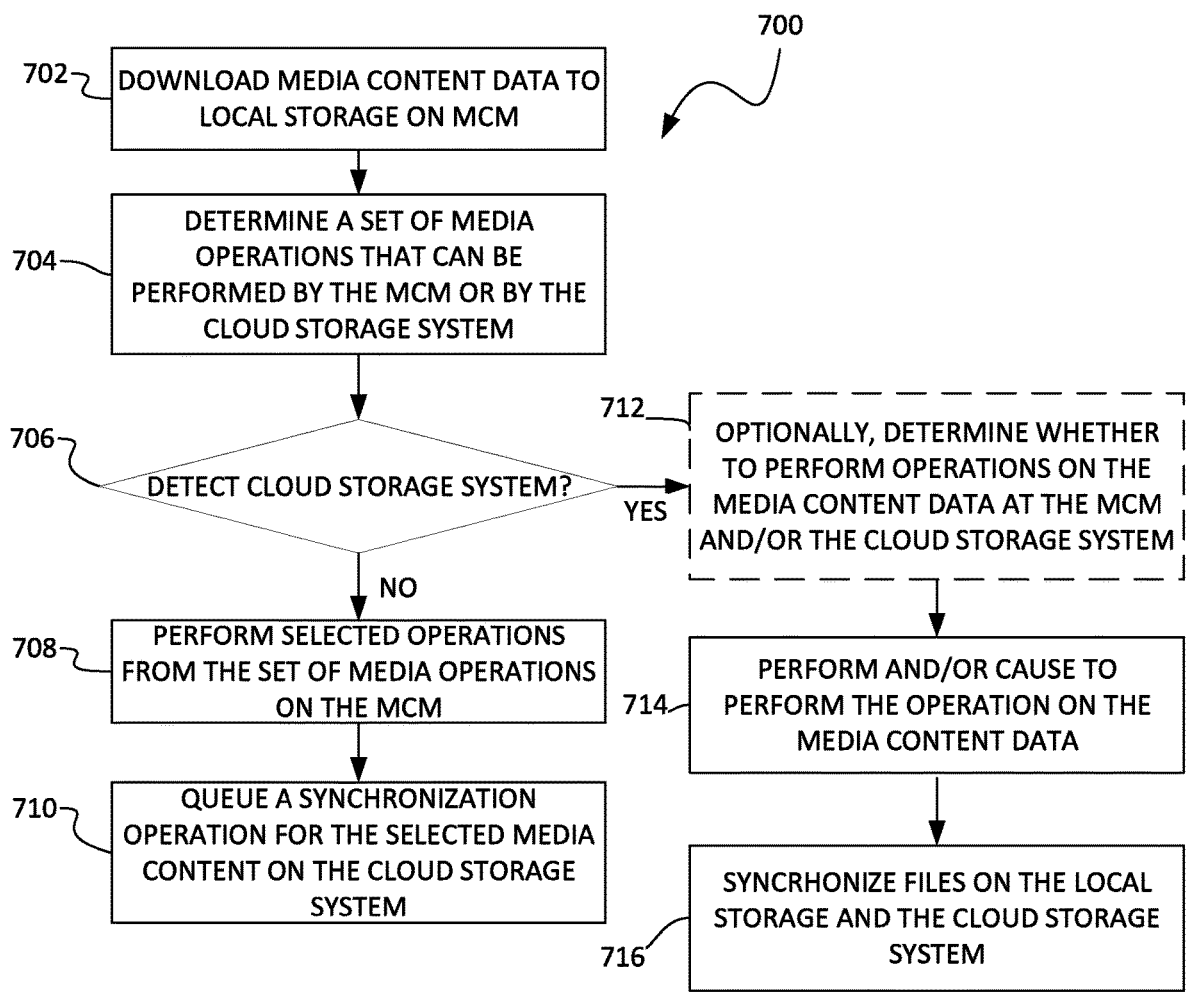

MEDIA CONTENT MANAGEMENT DEVICE

CROSS-REFERENCE TO RELATED APPLICATIONS

The present application claims priority to U.S. Provisional Patent Application No. 62/441,733, filed Jan. 3, 2017, the disclosure of which is hereby incorporated by reference in its entirety.

BACKGROUND

Field

The present disclosure relates to a media content management device, and more particularly a media content management device and related systems and methods for uploading media content to cloud storage systems and/or enabling pre-upload editing of media content.

Description of Related Art

Cloud storage systems provide access to data over computer networks. Some cloud storage systems communicate and synchronize data with other storage devices over the Internet.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings:

FIG. 7 is a flowchart of a synchronization process for an exemplary media content management device for providing cloud based media content management.

DETAILED DESCRIPTION

Overview

Figure 1:
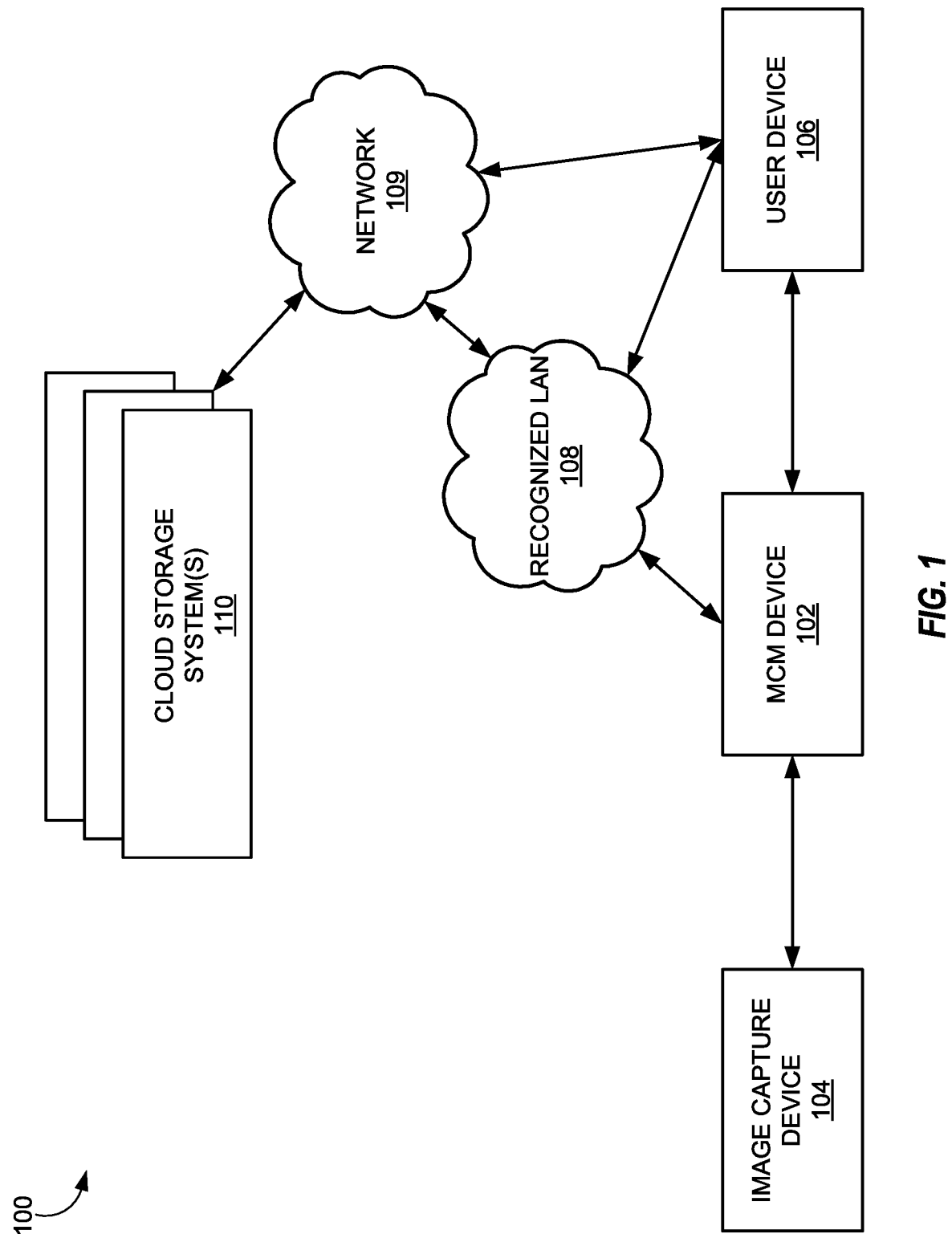
FIG. 1 is a diagram of an exemplary system that may be used to provide cloud based media content management.

Cloud storage systems are generally used to store many types of data (e.g., media content, documents, etc.) while allowing numerous client devices to access the data regardless of location. Cloud storage systems typically host physical servers and other components for storing user data and provide users with access to the data over a network (e.g., the Internet). Advantageously, cloud storage systems alleviate some of the burdens of managing local storage devices such as storage space limitations, enabling remote access across multiple client devices, and potential hardware failures.

While helpful, taking advantage of cloud storage systems has its drawbacks. For example, it can take a significant amount of time to upload data, particularly large media content files, to a cloud storage system, which can undesirably delay access and editing of the data. Additionally, the significant upload time can hinder operation of the client device until the upload is complete, as it is often practical to wait to upload data to a cloud system only once storage on the client device nears capacity. These drawbacks are significant for users such as photographers, videographers, medical imaging technicians, and the like who capture many large images, videos, or other large media content files. For example, a wedding photographer may capture many high resolution images during the wedding ceremony and want to quickly free up local storage space on their camera in order to continue capturing images for the wedding reception. Unless the photographer is equipped with multiple or large local storage devices, which can be costly and cumbersome, they would need to stop using the camera until the upload to a cloud storage system is complete. After the wedding reception, the photographer would have to wait to edit the images until after the upload is complete or delay uploading the images until after editing is complete on the client device, either of which inconveniences the photographer and the client. These drawbacks only become more significant as the number and size of media content files increases.

Accordingly, there is a need for improved systems and methods for uploading media content to cloud storage systems and enabling pre-upload editing of media content. Embodiments of the present disclosure are directed to this and other considerations.

Disclosed embodiments provide systems and methods for providing management of media content data.

Consistent with the disclosed embodiments, the media content management (MCM) device may include one or more memory devices storing instructions, and one or more processors configured to execute the instructions to perform steps of a method to provide management of media content data. The MCM device may execute the instructions to receive media content from a data source and upon detecting a network connection with a recognized local area network (LAN), may automatically upload the media content to one or more cloud storage systems. The MCM device may then open a communication path with a user device and transmit a portion of the media content for display on the user device before the upload to the one or more cloud storage systems is complete. The MCM device may then receive edited media content data from the user device and upload the edited media content data to the one or more cloud storage systems.

Consistent with the disclosed embodiments, systems and methods for providing management of media content data are also disclosed.

Further features of the disclosed design, and the advantages offered thereby, are explained in greater detail hereinafter with reference to specific embodiments illustrated in the accompanying drawings, wherein like elements are indicated be like reference designators.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to devices, systems, and methods for providing management of media content data. The device may include one or more memory devices storing instructions, and one or more processors configured to execute the instructions to perform steps of a method. Specifically, in some embodiments, the device may provide for automatically uploading media content to cloud storage systems while allowing for concurrent access, manipulation, and editing of the media content. To accomplish this, the device may execute the instructions to receive media content from a data source and upon detecting a network connection with a recognized local area network (LAN), may automatically upload the media content to one or more cloud storage systems. The device may then open a communication path with a user device and transmit a portion of the media content for display on the user device before the upload to the one or more cloud storage systems is complete. The device may then receive edited media content data from the user device and upload the edited media content data to the one or more cloud storage systems.

Although the above embodiments are described with respect to devices, it is contemplated that embodiments with identical or substantially similar features may alternatively be implemented as systems, methods, and/or non-transitory computer-readable media.

In the following description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, methods, and computer-readable mediums are disclosed for enabling cloud based media content management, and will now be described with reference to the accompanying figures. Embodiments of the disclosed technology may enable a user to automatically upload media content to a cloud server. According to some embodiments, a cloud based media content management system disclosed herein may enable a user to edit media content before, during, or after upload to a cloud server. The disclosed technology may enable a user device to seamlessly access and manipulate media content that is remotely stored in a cloud server system without experiencing the data transfer delays typically associated with accessing files that are remotely stored in a cloud server.

Media Content Management Device

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system 100 that may be configured to perform one or more processes for providing cloud based media content management. The components and arrangements shown in FIG. 1 are not intended to limit the disclosed embodiments as the components used to implement the disclosed processes and features may vary. As shown, system 100 may include a media content management device 102 (also referred to interchangeably herein as "MCM device 102"), an image capture device 104, a user device 106, a cloud storage system(s) 110, and/or other components. MCM device 102 and user device 106 may be connected to one another via a recognized local area network ("LAN") 108. MCM device 102 and user device 106 may connect with cloud storage systems 110 via recognized LAN 108 and through network 109. In some embodiments, user device 106 may bypass recognized LAN 108 and connect with cloud storage systems 110 directly through network 109.

According to some embodiments, MCM device 102 may automatically manage the storage and access of media content. For example, MCM device 102 may automatically manage the storage and access of media content associated with a particular user account or one or more user devices. MCM device 102 may be configured to receive media content from image capture device 104, provide access to the media content to user device 106, and automatically upload the media content for storage to cloud storage systems 110. In some embodiments, MCM device 102 may include applications, programs, or software configured to automatically upload media content to cloud storage systems 110, delete data from memory of MCM device 102 when the memory has reached capacity, and/or download media content from cloud storage systems 110 in response to a request to access the media content or in anticipation of a future request to access the media content.

In some embodiments, MCM device 102 may be capable of receiving data from image capture device 104 by establishing a wired or wireless connection with image capture device 104. For example, according to some embodiments MCM device 102 may receive data from image capture device via one or more of a Universal Serial Bus (USB) cord (e.g., USB-A, USB-C, etc.), FireWire, a local area network, Wi-Fi, Bluetooth, NFC, etc. In some embodiments, MCM device 102 may receive data from image capture device 104 by receiving a removable storage device associated with image capture device 104, such as for example, an SD card, flash drive, or a disk. According to some embodiments, image capture device 104 may be any device that is capable of capturing digital photographs, videos, or audio. For example, image capture device 104 may be a digital camera, a digital video camera, a GoPro™ device, a smartphone equipped with a camera and/or microphone, a drone equipped with a camera and/or a microphone, or any other such suitable device. In some embodiments, image capture device 104 may include a removable storage device such as an SD card, flash drive, or a disk.

In some embodiments, MCM device 102 may be capable of establishing a communication path with user device 106 so that data may be transmitted between MCM device 102 and user device 106. According to some embodiments, user device 106 may be a computing device that is capable of displaying and/or enabling the manipulation and editing of media files such as digital photos, digital videos, and digital audio files. For example, user device 106 may be a computing device, a laptop, a desktop computer, a smartphone, a tablet, or any other appropriate device. According to some embodiments, MCM device 102 may be capable of establishing a wireless connection with user device 106 using, for example Wi-Fi, Bluetooth, NFC, or any other such wireless communication protocol. In some embodiments, MCM device 102 may communicate with user device 106 via recognized LAN 108. In some embodiments, MCM device 102 may directly communicate with user device 106 over Wi-Fi without utilizing a connection to recognized LAN 108 or any other wireless LAN (e.g., using Wi-Fi Direct). In some embodiments, user device 106 may communicate with MCM device 102 via a wired connection, such as via a USB cord.

According to some embodiments, MCM device 102 may be capable of establishing a wired or wireless connection with recognized LAN 108. For example, in some embodiments, MCM device 102 may connect to recognized LAN 108 through a wired connection (e.g., via an Ethernet cable) or through a wireless connection (e.g., a Wi-Fi connection). As will be explained in greater detail below, recognized LAN 108 may be a trusted local access network that is associated with a user, such as the user's home or work Wi-Fi network. Recognized LAN 108 may provide a connection to cloud storage systems 110 via network 109. According to some embodiments, network 109 may include any one or more of, for example, the Internet, an intranet, a personal area network (PAN), a LAN, a wide area network (WAN), a wireless network, a cellular communications network, a public switched telephone network (PSTN), and/or any other type of network that may provide a communication link to cloud storage systems 110, which may be remotely located.

According to some embodiments, cloud storage systems 110 may include one or more remote servers that may be accessed by MCM device 102 or user device 106 via recognized LAN 108. As will be appreciated by those of skill in the art, cloud storage systems may allow for distributed data storage and processing, which may allow for such data storage and processing power to be readily scalable. Such distributed processing power may enable cloud storage systems 110 to process data significantly faster than a standalone device, such as, for example MCM device 102 or user device 106. Furthermore, the data storage scalability of such cloud storage may allow enable cloud storage systems 110 to provide, for all practical purposes, essentially limitless storage capacity. In some embodiments, cloud storage systems 110 can be any network cloud that provides network connectivity. For example, the cloud storage systems 110 can be a local area network, wide area network, intranet, or the Internet. In some embodiments, cloud storage systems 110 may be a remote storage system that may be provided by a third-party service provider. Cloud storage systems 110 may include one or more servers and extremely large storage subsystems, for example, Redundant Array of Independent Disks (RAIDs). Cloud storage systems 110 may include one or more networked storage solutions offered by various cloud storage services. In some embodiments, cloud storage systems 110 may require account or user identification credentials to access.

In some embodiments, cloud storage systems 110 may be used to store media content associated with an account of a user. In some embodiments, cloud storage systems 110 may receive uploads of media content data from, for example MCM device 102. Cloud storage systems 110 may include applications or software that may, upon receiving edited media content data, generate a copy of media content (e.g., a copy of a photo or video), apply edits to the copy of the media content in accordance with instructions specified by the edited media content data, and store the edited copy of the media content.

Figure 2:
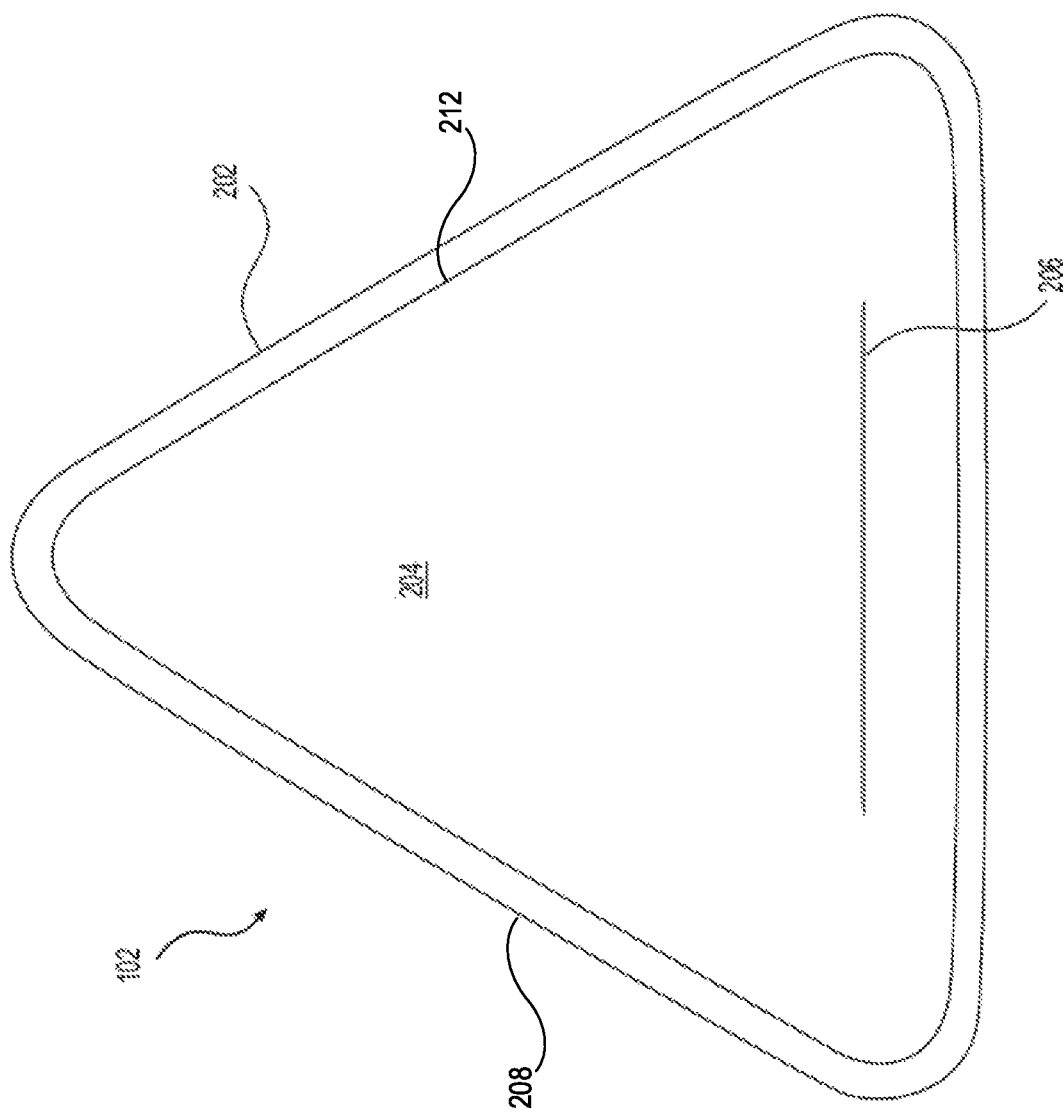
FIG. 2 shows a top view of an exemplary media content management device in a closed position.
Figure 3A:
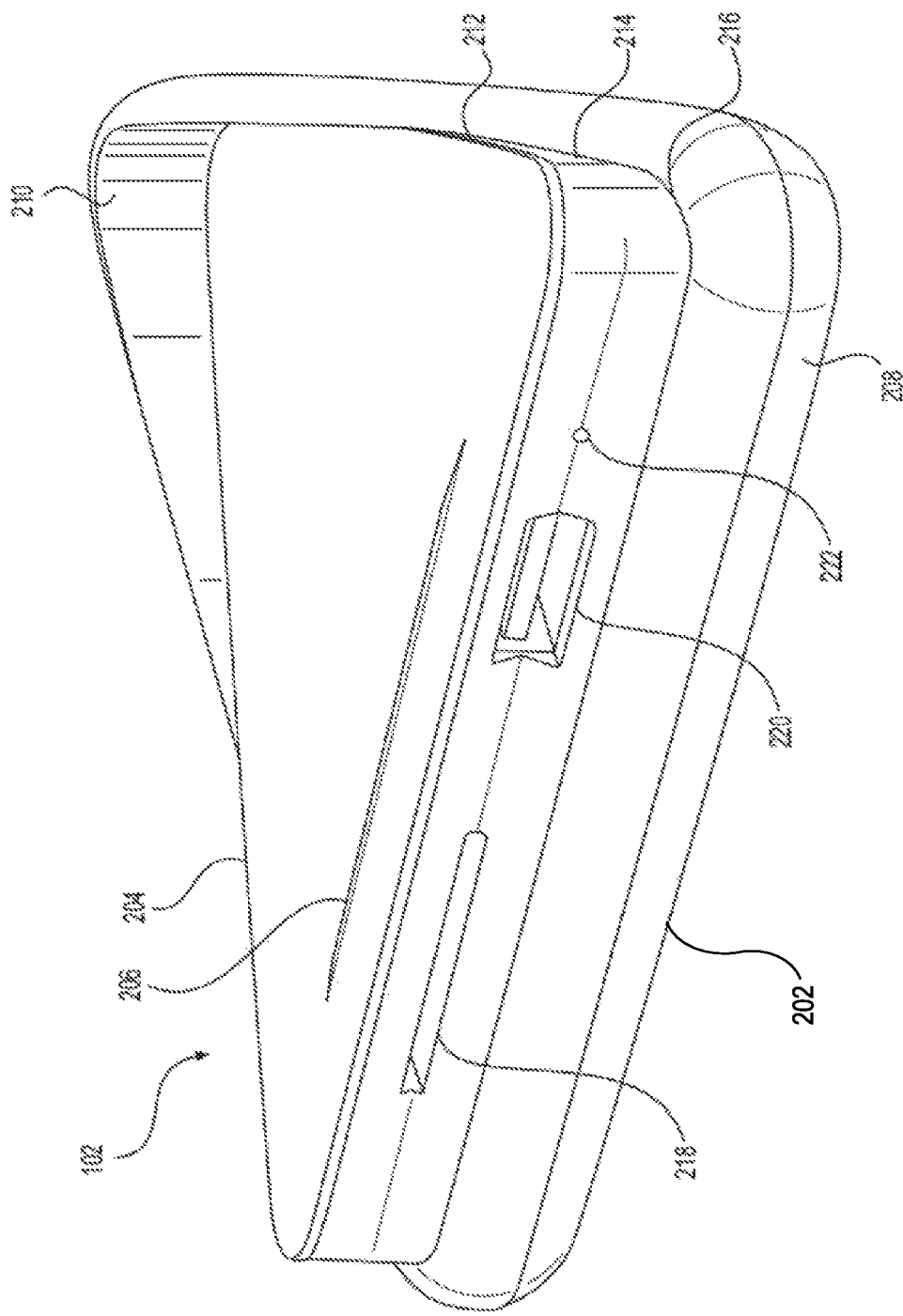
FIG. 3A shows an isometric front view of an exemplary media content management device in an open position.
Figure 3B:
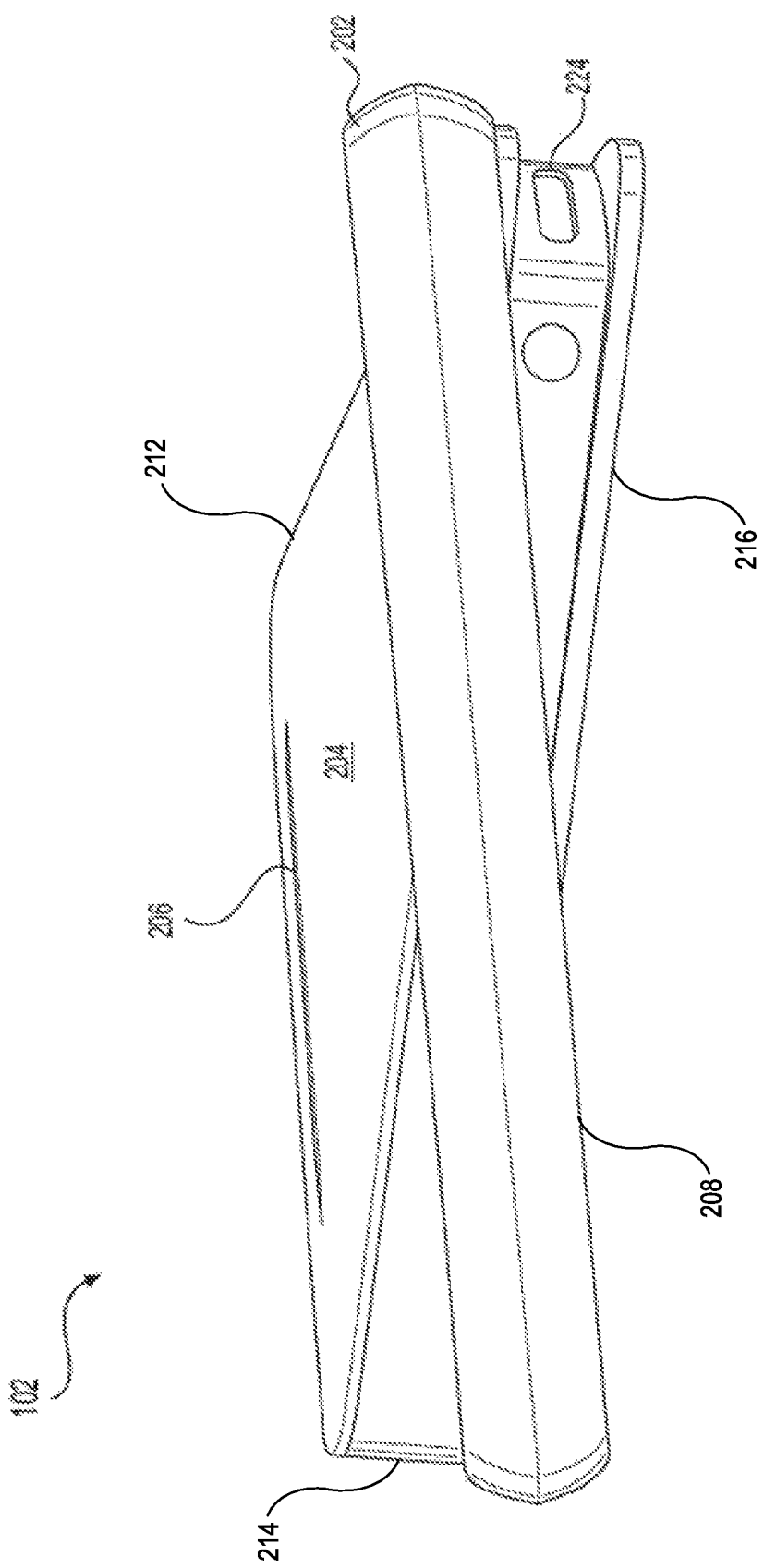
FIG. 3B shows an isometric rear view of an exemplary media content management device in an open position.
Figure 4:
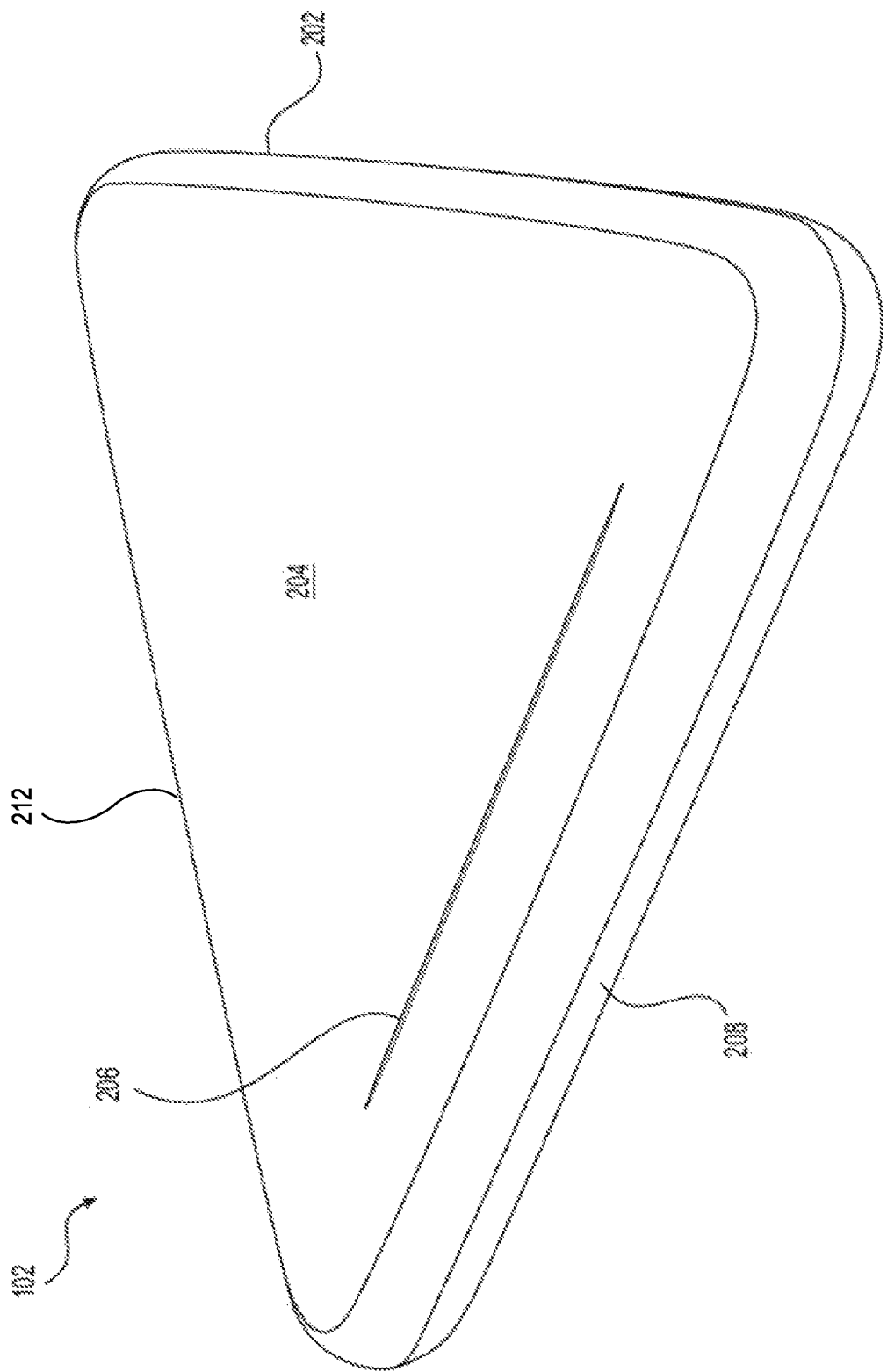
FIG. 4 shows an exemplary isometric front view of an exemplary media content management device in a closed position.

As shown by FIGS. 2 and 4, the MCM device 102 may include an outer shell 202, an inner body 204, and an impression 206. According to some embodiments, the outer shell 202, which includes an outer wall 208 and an inner wall 210, may serve to insulate the inner body 204 from dust, heat, moisture, and other possible sources of damage. In some embodiments, the inner body 204 may house some or all of the electrical components that enable the transfer and management of media content. In some embodiments, the inner body 204 may have substantially the same shape as the outer shell 202 and may be configured to fit substantially within the outer shell 202. For example, in some embodiments, as shown in FIG. 2, both the inner body 204 and the outer shell 202 may have a triangular shape and the outer edges of the inner body 204 may be positioned adjacent to the inner edges of the outer shell 202. In some embodiments, and as shown in FIGS. 3A and 3B, the inner body 204 may be configured to rotatably reside within the outer shell 202, such the inner body 204 may be toggled between a first position (a "closed position"), a second position (a "first open position"), and a third position (a "second open position"). As shown by FIGS. 2 and 4, when the inner body 204 is in a closed position, substantially all of the inner body 204 may be positioned within the outer shell 202 such that a top surface 212 of the inner body 204 presents a substantially contiguous surface with the top surface of the outer shell 202.

By contrast, as shown by FIG. 3A and FIG. 3B, when the inner body 204 is in the first open position, a front portion of a bottom surface 216 of the inner body 204 may be positioned adjacent to or above a front top edge of the outer shell 202, exposing a front face of the inner body 204, and a rear portion of the top surface 212 of the inner body 204 may be positioned below a rear bottom edge of the outer shell 202, exposing a rear face of the inner body 204. Similarly, the MCM device 102 can be flipped over such that the bottom surface 216 is exposed and the top surface 212 faces the abutting surface, and the inner body 204 may rotate, in the opposite direction of the first open position, to the second open position.

FIG. 3A illustrates an example embodiment of the MCM device 102 in which the inner body 204 has been rotated to a first open position. According to some embodiments, the inner body 204 may be rotated (e.g., about a central rotational axis extending in parallel with the exposed front side of the inner body 204) into the first open position in response to a downwardly applied force to a rear portion of the top surface 212 of inner body 204, which may cause the rear end of inner body 204 to move downwards and the front end of inner body 204 to move upwards, exposing the front surface of inner body 204 and a front portion of the side wall 214. When in the first open position, a front edge of the bottom surface 216 of inner body 204 may be substantially level with the top edge of the front face of the outer shell 202.

According to some embodiments, the front portion of the side wall 214 may include one or more input interfaces such as ports, connection points, or card readers. For example, according to some embodiments, the front portion of the side wall 214 of the inner body 204 may include a Secure Digital (SD) or Micro SD card slot 218, a Universal Serial Bus (USB) port 220, and a reset pin 222. The SD card slot 218 may receive an SD card and may include a card reader to read data from the SD card into the memory of the MCM device 102. A USB port 220 may serve to receive a USB cable to receive data from a USB-connected device, such as, for example, image capture device 104. According to some embodiments, when inner body 204 is in the first open position, the various input interfaces on the front portion of side wall 214 may be exposed (i.e., not obstructed by a wall of outer shell 202) such that a user may access them. Shown more clearly in FIG. 3B, this first open position may also expose the rear face of inner body 204, thereby exposing a charging USB port 224 (e.g., a USB-C port) or another charging port positioned on the rear face. Charging USB port 224 may be configured to receive a USB cable (not shown) for charging the MCM device 102 via a power source (not shown). The device may include other types of ports, such as Thunderbolt, Serial ATA (SATA), or the like.

Similarly, the inner body 204 may be rotated into a second open position in response to a downwardly applied force to a front portion of the top surface 212 of the inner body 204 (or to an upwardly applied force to a rear portion of the top surface 212 of the inner body 204), which may cause the front end of inner body 204 to move downwards and the rear end to move upwards, exposing the front and rear faces of the inner body 204. When in the second open position, a rear edge of the bottom surface 116 of inner body 204 may be substantially level with the top edge of the rear face of the outer shell 202 and a front edge of bottom surface 116 may be substantially level with the bottom edge of the front face of outer shell 202. According to some embodiments, the rear portion of the side wall 214 may include one or more ports or connection points, such as, for example a USB-C port. According to some embodiments, when inner body 204 is in the second open position, the input interfaces of the front portion of the side wall 214 (e.g., the front face of inner body 204) may be exposed (i.e., not obstructed by a wall of outer shell 202) and one or more input interfaces on the rear portion of side wall 214 may be exposed such that a user may access them. It should be understood that FIGS. 3A and 3B provide an exemplary embodiment and that any type of input interface or configuration of input interfaces may be integrated or utilized by the MCM device 102.

Figure 5:
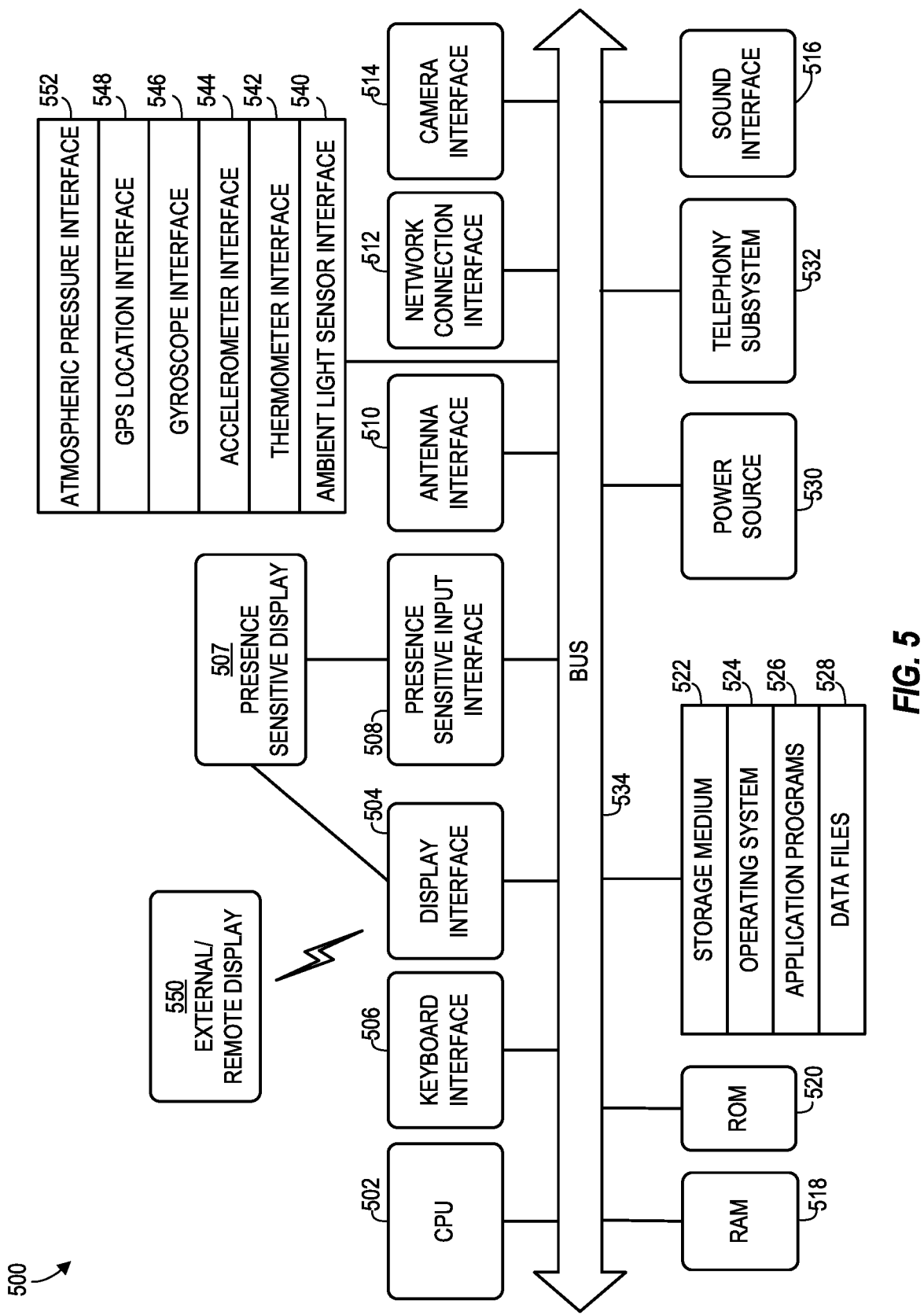
FIG. 5 is a block diagram of an exemplary media content management device architecture.

FIG. 5 depicts a block diagram of illustrative computing device architecture 500, according to an example embodiment. Certain aspects of FIG. 5 may be embodied in a computing device (for example, a mobile computing device). As desired, embodiments of the disclosed technology may include a computing device with more or less of the components illustrated in FIG. 5. For example, MCM device 102 may include a computing device with more or less of the components illustrated in FIG. 5. It will be understood that the computing device architecture 500 is provided for example purposes only and does not limit the scope of the various embodiments of the present disclosed systems, methods, and computer-readable mediums.

The computing device architecture 500 of FIG. 5 includes a CPU 502, where computer instructions are processed; a display interface 504 that acts as a communication interface and provides functions for rendering video, graphics, images, and texts on the display. In certain embodiments of the disclosed technology, the display interface 504 may be directly connected to a local display, such as a touch-screen display associated with a mobile computing device. In another example embodiment, the display interface 504 may be configured for providing data, images, and other information for an external/remote display that is not necessarily physically connected to the mobile computing device. For example, a desktop monitor may be utilized for mirroring graphics and other information that is presented on a mobile computing device. In some embodiments, the display interface 504 may wirelessly communicate, for example, via a Wi-Fi channel or other available network connection interface 512 to the external/remote display.

In an example embodiment, the network connection interface 512 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a High Definition Multimedia Interface (HDMI) port, a video port, an audio port, a Bluetooth port, a Near-Field Communication (NFC) port, another like communication interface, or any combination thereof.

The computing device architecture 500 may include a keyboard interface 506 that provides a communication interface to a keyboard. In one example embodiment, the computing device architecture 500 may include a presence-sensitive display interface 107 for connecting to a presence-sensitive display. According to some embodiments of the disclosed technology, the presence-sensitive display interface 507 may provide a communication interface to various devices such as a pointing device, a touch screen, a depth camera, etc. which may or may not be associated with a display.

The computing device architecture 500 may be configured to use an input device via one or more of input/output interfaces (for example, the keyboard interface 506, the display interface 504, the presence sensitive display interface 507, network connection interface 512, camera interface 514, sound interface 516, etc.) to allow a user to capture information into the computing device architecture 500. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 500 or may be a separate device. For example, the input device may be an accelerometer, a magnetometer, a digital camera, a microphone, and an optical sensor.

In some embodiments, the MCM device 102 is a special purpose portable computing device configured to provide content management services rather than a portable general purpose computing device that provides a wide variety of functions such as a laptop, tablet or mobile phone. For example, the MCM device 102 may not have a display or direct user input method for complex input, such as a keyboard, touchscreen, touchpad or the like. However, it may have one or a few buttons for simple user input and/or power control and data ports for data input. For example, an embodiment of the MCM device may only have a reset button and/or a power button, with no other hardware for direct user input (e.g. keyboard, touchscreen, etc.). By leaving out extraneous components, cost and power usage can be kept down, allowing for a product with a better price and/or longer battery life.

Example embodiments of the computing device architecture 500 may include an antenna interface 510 that provides a communication interface to an antenna; a network connection interface 512 that provides a communication interface to a network. In certain embodiments, a camera interface 514 is provided that acts as a communication interface and provides functions for capturing digital images from a camera. In certain embodiments, a sound interface 516 is provided as a communication interface for converting sound into electrical signals using a microphone and for converting electrical signals into sound using a speaker. According to example embodiments, a random access memory (RAM) 518 is provided, where computer instructions and data may be stored in a volatile memory device for processing by the CPU 502.

Example embodiments of the computing device architecture 500 may include various interfaces that provide communication interfaces to various sensors for data gathering. In certain embodiments, an ambient light sensor interface 540 is provided as a communication interface and provides functions for obtaining light data from an ambient light sensor. In certain embodiments, a thermometer interface 542 is provided as a communication interface and provides functions for capturing temperature data from a temperature sensor. In certain embodiments, an accelerometer interface 544 is provided as a communication interface and provides functions for obtaining accelerometer data from an accelerometer. In certain embodiments, a gyroscope interface 546 is provided as a communication interface and provides functions for obtaining gyroscope data from a gyroscope. In certain embodiments, a GPS location interface 548 is provided as a communication interface and provides functions for obtaining location data from a GPS receiver. In certain embodiments, an atmospheric pressure interface 552 is provided as a communication interface and provides functions for obtaining pressure data from a pressure sensor.

According to an example embodiment, the computing device architecture 500 includes a read-only memory (ROM) 520 where invariant low-level system code or data for basic system functions such as basic input and output (I/O), startup, or reception of keystrokes from a keyboard are stored in a non-volatile memory device. According to an example embodiment, the computing device architecture 500 includes a storage medium 522 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 524, application programs 526 (including, for example, a web browser application, a widget or gadget engine, and or other applications, as necessary) and data files 528 are stored. According to an example embodiment, the computing device architecture 500 includes a power source 530 (e.g., battery and/or power supply) that provides an appropriate alternating current (AC) or direct current (DC) to power components. According to an example embodiment, the computing device architecture 500 includes a telephony subsystem 532 that allows the transmission and receipt of sound over a telephone network. The constituent devices and the CPU 502 communicate with each other over a bus 534.

According to an example embodiment, the CPU 502 has appropriate structure to be a computer processor. In one arrangement, the CPU 502 may include more than one processing unit. The RAM 518 interfaces with the computer bus 534 to provide quick RAM storage to the CPU 502 during the execution of software programs such as the operating system application programs, and device drivers. More specifically, the CPU 502 loads computer-executable process steps from the storage medium 522 or other media into a field of the RAM 518 in order to execute software programs. Data may be stored in the RAM 518, where the data may be accessed by the computer CPU 502 during execution. In one example configuration, the device architecture 500 includes at least 125 MB of RAM, and 256 MB of flash memory.

The storage medium 522 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 522, which may comprise a machine-readable storage medium.

According to one example embodiment, the term computing device, as used herein, may be a CPU, or conceptualized as a CPU (for example, the CPU 502 of FIG. 5). In this example embodiment, the computing device may be coupled, connected, and/or in communication with one or more peripheral devices, such as display. In another example embodiment, the term computing device, as used herein, may refer to a mobile computing device, such as a smartphone or tablet computer. In this example embodiment, the computing device may output content to its local display and/or speaker(s). In another example embodiment, the computing device may output content to an external display device (e.g., over Wi-Fi) such as a TV or an external computing system.

In some embodiments of the disclosed technology, the computing device may include any number of hardware and/or software applications that are executed to facilitate any of the operations. In some embodiments, one or more I/O interfaces may facilitate communication between the computing device and one or more input/output devices. For example, a universal serial bus port, a serial port, a disk drive, a Compact Disc (CD) ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Figure 6:
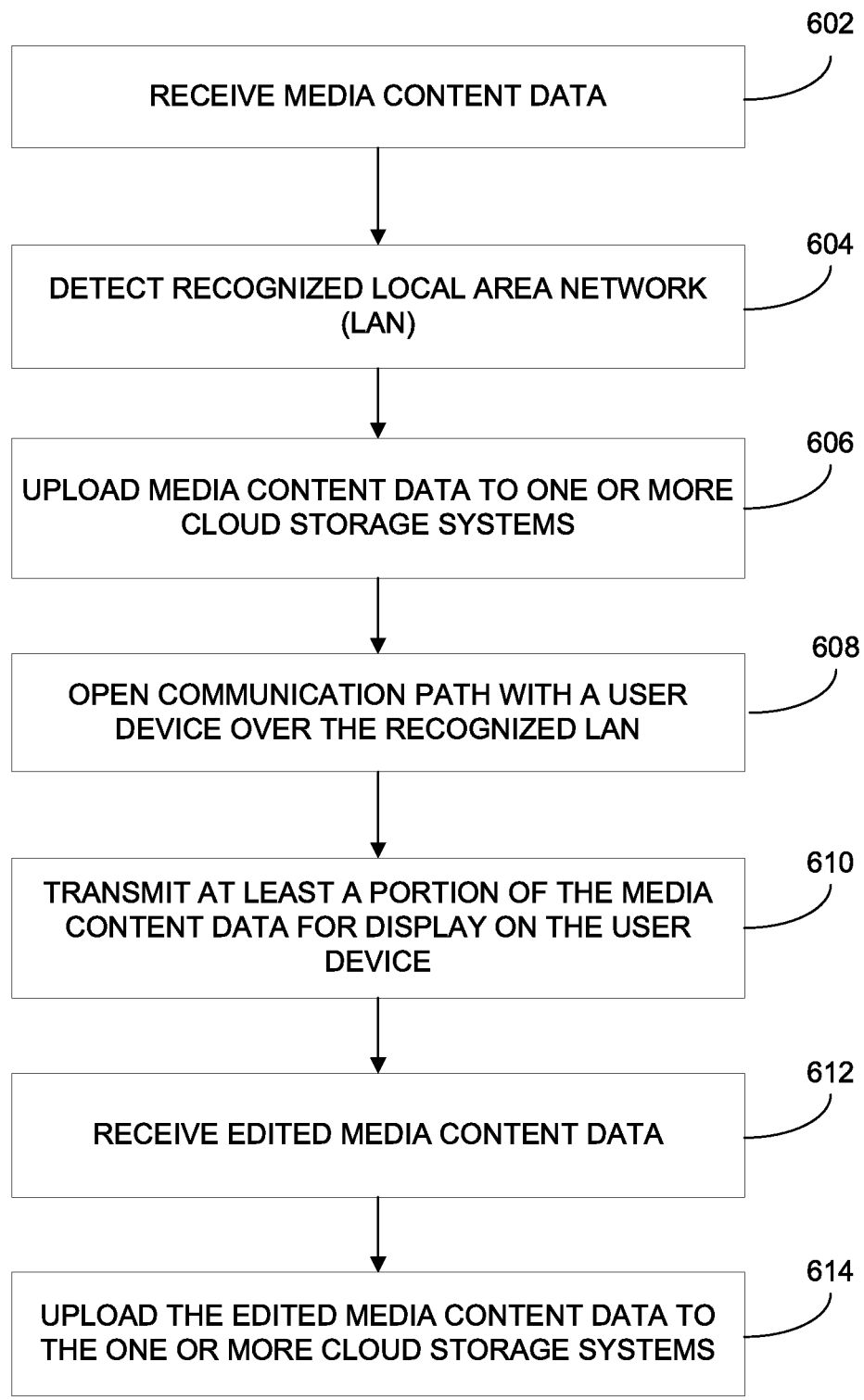
FIG. 6 is a flowchart of an upload process for an exemplary media content management device for providing cloud based media content management.

FIG. 6 shows a flowchart of upload method 600 for managing media content data. Media content data may be digital photos, videos, or audio recordings obtained by image capture device 104. Method 600 may be performed by MCM device 102 having some or all of the components of computing device 500. For example, method 600 may be performed by MCM device 102 using processor 502 to execute memory 522. In some embodiments, one or more steps of method 600 may be delegated to other devices or systems in system 100, such as user device 106 or cloud storage system(s) 110. In some embodiments, the steps may be performed in a different order. Following method 600, a user may edit media content prior to and during the automatic upload of the media content data to cloud storage system(s).

In step 602, MCM device 102 may receive media content data from a data source. Media content data may be data that is representative or associated with media content such as digital photos, video, and audio recordings. Accordingly, a data source may be digital camera, a smartphone, a GoPro™ device, a camera-equipped drone, or any other device that is capable of digitally capturing photos, video, or audio data. In some embodiments, MCM device 102 may receive the media content via a local communication port, such as, for example, a USB port, a secure disk card reader, a CD drive, and a Bluetooth interface. For example, MCM device 102 may receive an SD card from a digital camera in the SD port (i.e., SD card reader slot). Alternatively, MCM device 102 may receive media content via a USB cord, flash drive, disk, FireWire, etc. In embodiments where MCM device 102 receives media content data via a wired connection (e.g., via USB cable), MCM device 102 may be configured to provide the image capture device 104 with power from power source 530 via the wired connection, to ensure the image capture device 104 has enough power to complete the transfer of media content data. In some embodiments, MCM device 102 may receive the media content via a wireless connection, such as Wi-Fi, Bluetooth, near-field communications (NFC) or any other such wireless communication protocol that is suitable for wirelessly transferring data over short distances. Upon being downloaded or received, the media content may be stored in memory 522 of MCM device 102.

At step 604, MCM device 102 may detect for a network communication with a recognized LAN 108. For example, as will be understood by those of skill in the art, when active, as MCM device 102 moves about the world, it may detect various Wi-Fi networks as it comes into proximity with each signal of a wireless router associated with particular Wi-Fi network. Alternatively, MCM device 102 may be plugged into a wired LAN by use of, for example, an Ethernet cable. According to some embodiments, MCM device 102 may determine that a particular detected LAN is a recognized LAN 108 if it matches a LAN contained in a list of recognized LANs 108 stored by MCM device 102.

In some embodiments, MCM device 102 may receive and store a list of recognized LANs 108 and any associated login or password information in memory 522. According to some embodiments, MCM device 102 may be associated with a user account that includes user identification information, user preferences (e.g., download, upload, storage preferences), and a list of recognized LANs 108. According to some embodiments, the user account may be associated with a web-based application or program (e.g., the user account may be accessed by the user through a website), and the MCM device 102 may periodically or continuously download account information such as the list of recognized LANs 108 and user preferences from a device storing the account information. In some embodiments, MCM device 102 may receive a list of recognized LANs 108 from a user device 106. Upon detecting a new LAN, MCM device 102 may determine whether the newly detected LAN is a recognized LAN 108 by comparing it to the stored list of recognized LANs 108. In some embodiments, a recognized LAN 108 may be a trusted network associated with the user of the MCM device 102. For example, a recognized LAN 108 may be the Wi-Fi network in the user's home or business. Recognized LANs 108 may be LANs that have been previously configured (e.g., setting up security settings/passwords) by the user of the MCM device 102. According to some embodiments, a LAN may not be a recognized LAN 108 if it is a network that requires a user input, such as a login that has not been previously stored in MCM device 102. According to some embodiments, upon detecting a recognized LAN 108, MCM device 102 may automatically establish a network connection with the recognized LAN 108.

At step 606, in response to establishing a network connection with a recognized LAN, MCM device 102 may initiate an upload of the media content data to one or more cloud storage systems 110. In some embodiments, the upload of the media content data to the one or more cloud storage systems 110 may occur automatically as soon as MCM device 102 connects to a recognized LAN 108. According to some embodiments, the MCM device 102 may utilize a first-in-first-out (FIFO) upload protocol, such that media content data corresponding to media files (i.e., files corresponding to particular photos, videos, and the like) is uploaded to the cloud storage systems 110 in the order that each media file is downloaded or received. For example, if in step 602, MCM device 102 received media content data associated with a first video, a second video, and a third video, in that order, then MCM device 102 may upload the media content data associated with the first video (the second media file) first, the media content data associated with the second video (the second media file) second, and the media content associated with the third video (the third media file) last.

In some embodiments, the order that media files are uploaded from MCM device 102 to cloud storage systems 110 may be based on one or more factors, such as for example, an instruction received by MCM device 102 that one or more media files are to be shared with another user, file size, the day of the week, the time of day, data transfer limits associated with an account of the user, historical data associated with the recognized LAN 108 (e.g., data indicative of how data rates change over time), and any other factor that might affect upload speeds. For example, in some embodiments, if MCM device 102 receives an indication of a user input (e.g., via user device 106) that a user wants to share one or more media files (e.g., one or more photos or videos) with another device for another user, MCM device 102 may prioritize uploading the one or more media files that are to be shared with another user before other media files. In some embodiments, historical data associated with a recognized LAN 108 may indicate that the network uses a burst of high data transfer rates for an initial period but then throttles down the data transfer rate after the initial period, in which case, MCM device 102 may prioritize uploading the largest file types during the initial period of high data transfer rates. According to some embodiments, MCM device 102 may utilize various algorithms or machine learning techniques to attempt to minimize the amount of time uploading a group of media files to the cloud storage systems 110 takes.

At step 608, MCM device 102 may open a communication path with user device 106 over the recognized LAN 108. User device 106 may be a desktop computer, a laptop computer, a tablet, a smart phone, or any other device that is capable of establishing a communication path with MCM device 102. For example, MCM device 102 may establish a wireless connection, such as a Wi-Fi or Bluetooth connection with a laptop (i.e., user device 106) associated with the user. For example, the MCM may pair over Bluetooth with the user device, create a wireless ad-hoc network, and/or function as an access point to which other devices can connect. According to some embodiments, establishing a communication path between MCM device 102 and user device 106 may enable user device 106 to access files and data stored on MCM device 102. In some embodiments, application or program stored on user device 106 may be configured to cause user device 106 to display the contents of MCM device 102 on user device 106. For example, if MCM device 102 has five videos stored in memory 522, user device 106 may display thumbnail images that represent each of the five videos, and the communication path between the two devices may enable user device 106 to access the five videos for viewing, editing, or other manipulation. In some embodiments, user device 106 may be enabled to access and manipulate the media content data stored on MCM device 102. In some embodiments, MCM device 102 may push media content data (e.g., such as a copy of a photo) to user device 106 for viewing and manipulation.

It should be appreciated that although step 608 describes MCM device 102 opening a communication path with user device 106 over the recognized LAN 108, MCM device 102 may be capable of establishing a communication path with user device absent recognized LAN 108. For example, in some embodiments, MCM device 102 may directly communicate with user device 106 through a wired connection, or a direct wireless connection using, for example Wi-Fi or Bluetooth. Accordingly, it will be appreciated the embodiments of the present disclosure contemplate that user device 106 may be used to access, manipulate, and edit media content on MCM device 102 absent the presence of any external local area network. In such cases, any changes or edits made to the media content on MCM device 102 by user device 106 may be stored by MCM device 102 for future upload to cloud storage systems 110 upon MCM device 102 detecting and establishing a connection with a recognized LAN 108, through which it can access the cloud storage systems 110.

In some situations, the data source may and/or the user device 106 may not be capable of accessing the Internet directly. For example, the data source and/or user device may not have the required hardware capabilities, may not have a service plan with an Internet Service Provider, and/or may not be in range of a router or cell tower that can provide Internet access. For example, the data source may connect with the MCM device 102 to upload media content to the MCM device. In another example, the user device can connect to the MCM device to access and/or initiate operations on the media content locally stored there. In some embodiments, the MCM device offer operations identical to, similar to, or a subset of those available on the cloud storage system(s). However, rather than performing operations on the copies of media content stored on the cloud storage system(s), the operations can be performed on local copies. The MCM can then synchronize with the cloud storage system(s) when it later connects with the system(s).

At step 610, MCM device 102 may transmit at least a portion of the media content data for display on user device 106 before the upload to cloud storage systems 110 initiated in step 606 is complete. For example, if user device 106 receives (e.g., via user input) a selection of a media file (e.g., photo, video, or audio file) that is stored on MCM device 102 that is in a queue awaiting upload to cloud storage systems 110, MCM device 102 may transmit media content data associated with the media file to user device 106. In some embodiments, the media content data may comprise first media content data associated with one or more of a digital video and a digital image, and transmitting at least a portion of the media content data for display on the user device further comprises providing, in unaltered form, the first media content data for display on the user device. The media content data associated with the media file may correspond to a portion or all of a video, photo, or audio file. In some embodiments, user device 106 may enable the display, editing, or manipulation of a portion of the media file upon receiving the at least a portion of the media content data. For example, a program or application stored on user device 106 may serve to load a portion of the media content (e.g., a portion of a photo, video, or audio file) for display and provide a user interface for editing a portion of the media content. The user device 106 may generate edited media content data representative in response to receiving one or more user inputs representative of edits to the media content. The user device 106 may then store edited media content data corresponding to the at least a portion of the media content data in response to receiving one or more user inputs representative of edits to the portion of the media content.

In some embodiments, the user device 106 may contain video editing software that generates edited media content data in response to a user using the video editing software to make edits to a portion of a video. Accordingly, in some embodiments, the edited media content data may represent edits or instructions to edit a portion of the media content (e.g., edits to a portion of a video). The edits or instructions to edit a portion of the media content may be applied to the original media content or a copy of the original media content. Accordingly, in some embodiments, a new media file (e.g., a new video file including the edits made on user device 106) may be generated by another device (e.g., MCM device 102 or cloud storage systems 110) after the edited media content data is received by the other device. For example, the edited media content data may represent instructions to increase the contrast of a portion a video. In response to receiving the edited media content data, storage cloud systems 110 may automatically generate an edited version of a stored video (i.e., a version with a portion of the video having the increased contrast specified by the edited media content data).

In some embodiments, the user device 106 may contain photo editing software that may generate edited media content data that is representative of an edited copy of the original photo. Accordingly, in some embodiments, the user device 106 may generate a new edited copy of the media content. For example, if the user device 106 receives media content data representative of a photo, the user device 106 may display the photo and in response to receiving user inputs representative of the edits to the photo, the user device 106 may generate edited media content data representative of a new edited version of the original photo. Thus, it should be understood that according to various embodiments, it is contemplated that the edited media content data generated by the user device 106 may represent either a new edited version of the media content or it may represent edits or instructions to edit a portion of the media content by another device.

At step 612, MCM device 102 may receive edited media content data corresponding to the transmitted at least a portion of the media content data. For example, user device 106 may transmit the edited media content data to MCM device 102 in response to a user making edits to a portion of the media using user device 106. According to some embodiments, MCM device 102 may store the edited media content data upon receiving it. As described above, edited media content data may include data representing edits or instructions to edit a portion of the media content or may include data representing a new edited version of the media content. For example, edited media content data may include data that represents instructions to modify a photo or video by, for example, adjusting the color or brightness of an image, superimposing an image or icon, deleting a portion of an image, modifying the playback speed of a video, muting/modifying/adding sound to a video, or any other type of digital photo or video editing that is known in the art. In some embodiments, in response to receiving edited media content data representative of instructions to edit a media content file, MCM device 102 may generate a copy of the respective media content and apply the edits specified by the edited media content data to the copy of the media content. Alternatively, as described above, and in some embodiments, edited media content data may include data that represents an edited version of original media content (e.g., a photo or video) stored on MCM device 102. Accordingly, in some embodiments, in response to receiving edited media content data corresponding to the transmitted at least a portion of the media content, MCM device 102 may store an edited version of original media content stored by MCM device 102.

At step 614, MCM device 102 may upload the edited media content data to the one or more cloud storage systems 110. For example, MCM device 102 may transmit edited media content data received in at step 612 to cloud storage systems 110 via recognized LAN 108. According to some embodiments, MCM may exclusively communicate with cloud storage systems 110 via a recognized LAN 108. As described above, edited media content data may include data that represents an edited version of the original media content or edits or instructions to edit the original media content. Accordingly, in some embodiments, at step 614, MCM device 102 may upload an edited copy of original media content (e.g., an edited photo or edited video) to cloud storage systems 110. In some embodiments, MCM device 102 may upload edits or instructions to edit original media content. In some embodiments, in response to receiving edits or instructions to edit original media content, cloud storage systems 110 may automatically generate a copy of the original media content, execute the instructions to apply the edits to the copy of the original media content, and store the edited copy of the media content. According to some embodiments, MCM device 102 may also store the edited copy of the media content. For example, in an instance where cloud storage systems 110 automatically generates an edited copy of the media content, cloud storage systems 110 may then automatically transmit a copy of the edited media content back to MCM device 102 so that the edited media content may be stored by both cloud storage systems 110 and MCM device 102.

As described above, MCM device 102 may store and automatically upload a copy of media content received from an image capture device to cloud storage systems 110. According to some embodiments, cloud storage systems 110 may store a copy of every original media file (e.g., digital photo, video, or audio file) ever received by MCM device 102. Furthermore, as described above, in some embodiments, cloud storage systems 110 may also store edited copies of the media files. Accordingly, cloud storage systems 110 may serve as a permanent repository for a user to store both media content originally obtained by image capture device 104 as well as any edited versions of the media content.

While cloud storage systems 110 may act as a permanent storage for a user's media content, MCM device 102 may be considered to be interim storage for the media content so that it may be quickly accessed and utilized by, for example, user device 106. In other words, as will be understood by those of skill in the art, in a typical case, it will be considerably faster for user device 106 to access and modify media files from MCM device 102 using a local wired or wireless connection (e.g., recognized LAN 108, Bluetooth, etc.) than for MCM device 102 to attempt access and modify media files from cloud storage systems 110 via a connection that requires transmitting data via the Internet. Accordingly, in some embodiments, when a user of user device 106 desires to access and/or manipulate media content that was previously downloaded to MCM device 102 from, for example, image capture device 104, although that media content is automatically uploaded to cloud storage systems 110 (upon detecting a recognized LAN 108 as described above), user device 106 may more quickly access the media content by accessing a copy stored on MCM device 102. Therefore, in addition to providing automatic media file upload and storage to cloud storage systems 110, MCM device 102 advantageously provides a user device 106 with the ability to access the media content significantly faster than it would be able to access it from the cloud storage systems 110. Further, as described above, MCM device 102 enables a user of user device 106 to immediately and access, manipulate, and edit media content stored on MCM device 102 before, during, or after the media content has been uploaded to cloud storage systems 110 by MCM device 102. MCM device 102 enables the seamless automatic uploading and editing of media content, such that a user accessing media content using user device 106 may be enabled to do so quickly and without regard to the status of the uploading of media files from MCM device 102 to cloud storage systems 110.

As will be understood by those of skill in the art, cloud storage systems 110 provide essentially limitless storage capacity for media content, whereas a mobile device, such as MCM device 102 may have a more limited storage capacity. According to some embodiments, MCM device 102 may store copies of all of the same files that are automatically uploaded to cloud storage systems 110 in association with a user account such that a user may access any of the files on MCM device 102 via, for example, user device 106. However, according to some embodiments, in the event that MCM device 102 reaches its maximum storage capacity such that it does not have room to store newly received media content, MCM device 102 may delete some locally stored media content data to make room for new media content. According to some embodiments, this deletion of locally stored media content data may be performed automatically by MCM device 102 in accordance with one or more deletion protocols. For example, in some embodiments, MCM device 102 may use a first-in first-out deletion protocol such that it deletes the oldest media files first. In some embodiments, MCM device 102 may use a last-accessed deletion protocol where it deletes the media files that were last accessed by, for example, user device 106. In some embodiments, MCM device 102 may create groups of media files and delete media files of the same group. For example, MCM device 102 may designate all photos that were received in a single download from an SD card as being from the same group (e.g., all photos may be from a user's trip to the beach). In some embodiments, MCM device 102 may designate photos as being part of the same group based on access patterns of the user (e.g., MCM device 102 may consider photos A, B, and C a group if a user typically accesses photos B and C immediately after accessing photo A). In some embodiments, MCM device 102 may utilize various algorithms or machine learning techniques to determine what media content to delete when MCM device 102 reaches its storage capacity.

According to some embodiments, MCM device 102 may automatically delete locally stored media content as described above in response to receiving new media content from a data source, such as image capture device 104. In some embodiments, MCM device 102 may also automatically delete locally stored media content in response to receiving an instruction to transmit data to media content data associated with media content not currently stored on MCM device 102 to user device 106. For example, if a user of user device 106 requests to access a photo that has been previously deleted from MCM device 102, then in some embodiments, MCM device 102 may automatically delete locally stored media content data as described above in order to make room to download the requested photo from cloud storage systems 110.

Accordingly, in some embodiments, if user device 106 requests to access media content that is stored on cloud storage systems 110 but that is not currently stored on MCM device 102, MCM device 102 may download the requested content from cloud storage systems 110 to make it available to user device 106. As will be understood by those of skill in the art, there will likely be a delay in user device 106 accessing the requested media content from MCM device 102 due to the time required to download the media content from cloud server systems 110.

Accordingly, to avoid this delay, it is desirable to anticipate which media files a user may request to access before the user makes the request. Therefore, according to some embodiments, MCM device 102 may predict which media content a user is likely to request to access and automatically download this media content from cloud server systems 110 to eliminate the delay experienced by the user in having to fetch requested media content after a request is made. For example, if user device 106 requests to access a first photo of a plurality of photos that has been designated as a group by MCM device 102 (as described above) such that MCM device 102 must download the first photo of the group from cloud server systems 110, MCM device 102 may automatically download all photos in the group in anticipation that the user may request to access other photos in the group. Therefore, in the event that the user does request to access a second photo of the group, because MCM device 102 already automatically initiated the download of this photo, user device 106 may be able to access the second photo in the group from MCM device 102 without experiencing the delay of MCM device 102 having to download the second photo from cloud storage systems 110.

According to some embodiments, MCM device 102 may utilize various algorithms or machine learning techniques to make predictions about what media content a user may request to access in the near future and may automatically download media content from cloud server systems 110 based on the predictions. Predictions may be made based on historical data and patterns of user access of media content, social media data associated with a social media account of a user, news events, the location of user, and other such data.

FIG. 7 shows a flowchart of a synchronization method 700 for managing media content data. Method 700 may be performed by an embodiment of the MCM device 102 having some or all of the components of computing device 500. For example, method 700 may be performed by MCM device 102 using processor 502 to execute memory 522. In some embodiments, one or more steps of method 700 may be delegated to other devices or systems in system 100, such as user device 106 or cloud storage system 110. In some embodiments, the steps may be performed in a different order.

At step 702, the MCM device 102 downloads the media content data from a source device to local storage on the device, such as a storage medium 522. For example, the MCM device 102 can connect to an image capture device 104 and download the media content data from the image capture device 104. The media content data may be new content generated by the user, and not yet found on the MCM device 102 or on the cloud storage system 110.

At step 704, the MCM device 102 identifies a set of media operations that can be performed by the MCM or by the cloud storage system on the downloaded media content data. Such operations can include both autonomous operations and user-directed operations, such as the edit operations discussed in FIG. 6. For example, the MCM device 102 may communicate with a user device 106 to obtain instructions to perform operations from the user. In other cases, the MCM device 102 may be configured to initiate certain operations automatically, for example, through device settings or pre-programmed functions.

Some example autonomous operations include updating the metadata, transcoding files into different formats and/or resolutions, identifying metadata for use in creating search indexes, generating the search indexes, and/or the like. For example, the MCM device 102 may read geographic location metadata on a file, which is typically in longitude and latitude coordinates and translate it into a more user-friendly format, such as a city name. The MCM device can then update the metadata on the file to include the user-friendly format. In another example, the MCM device can generate thumbnails or otherwise smaller-sized files (e.g., compressed format or lower resolution) for faster viewing of the files over a network, as smaller files are more quickly transmitted. In another example, the MCM device can transcode the file into a different format. As some cameras save files in a camera RAW format that is specific to a particular camera manufacturer, the MCM device can convert those files into jpg files, which are compatible with more devices. Similarly, the MCM device can convert less common video formats into a more widely used format, such as H.264. Many different types of files can be converted, such as Word/Excel to Portable Document Format (PDF). This can allow more user devices to view the files, without needing to install specific software that supports the less common file formats.

Some example user-directed operations include renaming files, deleting files, moving files into different folders, performing image modifications on pictures or videos, or the like. For example, the user may view thumbnails of their photos on their device and then select photos for deletion, rotation, and/or moving to different folders. The MCM may then execute those operations on the files stored on the device or cause those operations to execute on files stored on the cloud storage system 110. In some embodiments, some autonomous operations may also be initiated by the user and vice versa.

In some embodiments, the source device and/or the user device are local to the MCM device 102. The local source device and local user device are physically close enough to operate on the same local network or in direct wireless or wired communication with the MCM device.

At step 706, the MCM device 102 detects if the cloud storage system 110 is reachable. In some situations, the MCM device 102 may not have an available wide area network (e.g., Internet) connection to reach the cloud storage system 110. For example, embodiments of the MCM device which are portable may be taken away from its customary location (e.g., home or office) with access to the network to which it customarily is connected to another location without an Internet connection (e.g., outdoors). If the cloud storage system 110 is not reachable, the method proceeds to steps 708 and 710. If the cloud storage system 110 is reachable, the method proceeds to steps 712, 714 and 716.

At step 708, the MCM device 102 performs selected operations from the set of media operations on the MCM. By performing these operations on the MCM device, the user may be provided greater responsiveness to any user-directed operations. For example, rather than waiting for operations to be performed when a connection to the cloud storage system 110 is available, the MCM device can perform those operations in substantially real-time in response to the user's instructions. Furthermore, performing those operations locally can off-load some computational burden from the cloud storage system.

At step 710, the MCM device 102 queues a synchronization operation for the selected media content on the cloud storage system 110 in order to synchronize any changes made to the local file with the cloud copy of the file. The synchronization operation can be initiated when the cloud storage system 110 becomes accessible from the MCM device 102 (e.g., when the MCM device rejoins its home network). The synchronization operation causes all or at least a subset of the files on the MCM device 102 to match the files on the cloud storage system 110. For example, the MCM device 102 may upload updated files to the cloud storage system 110 or download updated files from the cloud storage system 110.

In one embodiment, the MCM device 102 determines differences between the file versions found locally on the device and files found on the cloud storage system 110. In certain situations, the MCM device can send change instructions instead of the entire file in order to save bandwidth. For example, some operations such as file name changes or rotation of images, which minimally change the file, can more efficiently be sent as instructions.

Moving back to step 712, the MCM device 102, in response to detecting that the cloud storage system 110 is available, may optionally determine whether to perform operations on the media content data locally at the MCM device and/or at the cloud storage system. Some operations may be more easily performed at the MCM device rather than the cloud storage system and vice versa. In one embodiment, the MCM device can make a determination, based on criteria such as speed, bandwidth, transmission time, responsiveness or the like, on where to perform the function. For example, if bandwidth is limited (e.g., connection is over slower 2G/3G cellular technology), the MCM device can chose to perform the file operations locally and then transfer the files to the cloud storage system 110 later, when the available bandwidth increases or rises above a certain threshold. As embodiments of the MCM device are battery-powered for portability, this can increase battery life by reducing active times of the MCM device. In another example, the MCM device may transcode and/or compress files into smaller files and then send the smaller smiles to the cloud storage device 110, rather than sending the entire file. In some situations, the user may only want to share or publish lower resolution files online, while keeping the higher resolution files on the MCM device. For example, a photographer may provide lower resolution images online for viewing on computing devices, while keeping higher resolution images on the MCM device.

In some situations, the MCM device 102 may split the operation so that it occurs both at the MCM device and the cloud storage system 110. For example, the MCM device may generate thumbnails locally, but then rely on the cloud storage system for more computationally intensive tasks, such as image manipulation or editing functions. In another example, the MCM device may identify search metadata on the local files but then send the metadata and the files to the cloud storage system, which can then generate/update search indexes.

At step 714, the MCM device 102 can perform the operation on the local copy of the media content data and/or can cause the cloud storage system to perform the operation on the cloud storage system 110. For example, the MCM device 102 may perform the operation locally and then transfer the files to the cloud storage system. Alternatively, the MCM device 102 can perform the operation locally and then transmit instructions to cause the cloud storage system 110 to perform the operation on the remote copy, assuming a copy of the media content data already exists on the cloud storage system 110. In another alternative, the MCM device 102 can cause the cloud storage system to perform the operation on the remote copy and then download the edited remote copy from the cloud storage system 110.

At step 716, the MCM device 102 can synchronize files on the local storage and the cloud storage system 110. Synchronization can involve all or a subset of files on the MCM device 102. As discussed above, it may involve sending full copies of files or sending instructions that apply changes to the cloud copy to make them the same as the local copy and vice versa.

In some embodiments, the method 700 may incorporate at least some of the steps described in FIG. 6, such as any or all of steps 604-614. For example, before completing (or even initiating) the file upload to the cloud storage system 110, the MCM device 102 can transmit at least a portion of the media content data for display on the user device. This can provide the user the opportunity to edit files earlier than if the MCM device waits to complete the upload.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

What is claimed is:

1. A portable media content management (MCM) device configured to allow a user device to manage media content data maintained in a cloud storage system during Internet availability and a local copy of the media content data during Internet unavailability, the MCM device comprising:
   a communication port for communicating with a local source device and with the cloud storage system;
   a storage medium for storing media content;
   one or more processors in communication with the communication port; and
   memory in communication with the one or more processors and storing instructions that, when executed by the one or more processors, are configured to cause the MCM device to:
   detect that the user device is on a same local area network as the MCM device;
   receive, via the communication port, media content data from the local source device;
   determine a set of media operations performable by the MCM device on a locally stored copy of the media content data on the storage medium that are also performable by the cloud storage system on a remotely stored copy of the media content data on the cloud storage system;
   identify a first media edit operation and a second media edit operation from the set of media operations to perform on the media content data;
   determine which of the first media edit operation and the second media edit operation is a more computationally-intensive operation and which is a less computationally-intensive operation;
   determine that the cloud storage system is reachable over a wide area network from the MCM;
   in response to determining that the cloud storage system is reachable over the wide area network and that available bandwidth does not exceed a threshold:
      perform both the first media edit operation and the second media edit operation locally; and
      synchronize the locally stored copy of the media content data with the remotely stored copy of the media content data at a later time in response to available bandwidth exceeding the threshold; and
   in response to determining that the cloud storage system is reachable over the wide area network and that available bandwidth exceeds the threshold:
      perform the more computationally-intensive operation on the remotely stored copy of the media content data on the cloud storage system;
      perform the less computationally-intensive operation on the locally stored copy of the media content data on the storage medium; and
      queue a synchronization operation for synchronizing the media content data on the cloud storage system, the synchronization operation comprising:
         determining differences between the locally stored copy and the remotely stored copy of the media content data;

generating instructions to cause the cloud storage system to modify the remotely stored copy of the media content data to match the locally stored copy; and transmitting the generated instructions to the cloud storage system, without sending the locally stored copy of the media content data.

2. The MCM device of claim 1, wherein the first media edit operation comprises at least one of changing a file name, updating metadata, manipulating an image, identifying a search term, and transcoding a file.

3. The MCM device of claim 1, wherein:
the MCM device further comprises a battery; and
the MCM device is portable.

4. The MCM device of claim 1, wherein the communication port comprises at least one of a Universal Serial Bus port, a secure disk card reader, a Compact Disc drive, a Wi-Fi port, and a Bluetooth port.

5. The MCM device of claim 1, wherein identifying the first media edit operation from the set of media operations to perform comprises:
transmitting at least a portion of the media content data for display on a local user device, the local user device different from the local source device; and
obtaining instructions from the local user device to perform the first media edit operation.

6. The MCM device of claim 5, wherein the local user device, the MCM device, and the local source device are connected to the same local area network.

7. The MCM device of claim 5, wherein:
the local source device is configured to be physically connected to the MCM device via a data transfer cable; and
the local user device is configured to be wirelessly connected to the MCM device.

8. The MCM device of claim 1, wherein:
the less computationally-intensive operation comprises one or more of: changing a file name, updating metadata, and identifying a search term; and
the more computationally-intensive operation comprises one or more of: manipulating an image, transcoding a file, generating a search index, and updating a search index.

9. A method for managing content on a portable media content management (MCM) device, the MCM device configured to allow a user device to manage media content data maintained in a cloud storage system during Internet availability and a local copy of the media content data during Internet unavailability, the method comprising:
detecting that the user device is on a same local area network as the MCM device;
receiving media content data from a local source device;
storing a local copy of the media content data on a storage medium of the MCM device;
determining a set of media operations that can be performed by the MCM device on the locally stored copy of the media content data that are also performable by a cloud storage system on a remotely stored copy of the media content data on the cloud storage system;
identifying a first media edit operation and a second media edit operation from the set of media operations to perform on the media content data;
determining which of the first media edit operation and the second media edit operation is a more computationally-intensive operation and which is a less computationally-intensive operation;
determining that the cloud storage system is reachable over a wide area network from the MCM device;
in response to determining that the cloud storage system is reachable over the wide area network and that available bandwidth does not exceed a threshold:
performing both the first media edit operation and the second media edit operation locally; and
synchronizing the locally stored copy of the media content data with the remotely stored copy of the media content data at a later time in response to available bandwidth exceeding the threshold; and
in response to determining that the cloud storage system is reachable over the wide area network and that available bandwidth exceeds the threshold:
performing the more computationally-intensive operation on the remotely stored copy of the media content data on the cloud storage system;
performing the less computationally-intensive operation on the locally stored copy of the media content data; and
queuing a synchronization operation for synchronizing the media content data on the cloud storage system, the synchronization operation comprising:
determining differences between the locally stored copy and the remotely stored copy of the media content data;
generating instructions to cause the cloud storage system to modify the remotely stored copy of the media content data to match the locally stored copy; and
transmitting the generated instructions to the cloud storage system, without sending the locally stored copy of the media content data.

10. The method of claim 9, wherein performing the first media edit operation on the cloud storage system comprises:
determining whether to perform the first media edit operation on one or more of the MCM device and the cloud storage system; and
selecting to perform the first media edit operation on the cloud storage system.

11. The method of claim 9, wherein the first media edit operation comprises at least one of changing a file name, updating metadata, manipulating an image, identifying a search term, and transcoding a file.

12. The method of claim 9, wherein identifying the first media edit operation from the set of media operations to perform comprises:
transmitting at least a portion of the media content data for display on a local user device, the local user device different from the local source device; and
obtaining instructions from the local user device to perform the first media edit operation.

13. The method of claim 12, wherein transmitting at least the portion of the media content data for display on the local user device is initiated prior to completing upload of the media content data to the cloud storage system.

14. The method of claim 12, wherein the local user device, the MCM device, and the local source device are connected to the same local area network.

15. The method of claim 12, wherein:
the local source device is physically connected to the MCM device via a data transfer cable; and
the local user device is wirelessly connected to the MCM device.

16. The method of claim 9, wherein:
the less computationally-intensive operation comprises one or more of: changing a file name, updating metadata, and identifying a search term; and
the more computationally intensive operation comprises one or more of: manipulating an image, transcoding a file, generating a search index, and updating a search index.

17. A portable media content management (MCM) device configured to allow a user device to manage media content data maintained in a cloud storage system during Internet availability and a local copy of the media content data during Internet unavailability, the MCM device comprising:
a communication means for communicating with a local source device;
a storage means for storing media content;
one or more processing means in communication with the communication means; and
a memory means in communication with the one or more processing means and storing instructions that, when executed by the one or more processing means, are configured to cause the MCM device to:
receive, via the communication means, media content data from the local source device;
determine a set of media operations that can be performed by the MCM device on a locally stored copy of the media content data on the storage means and by the cloud storage system on a remotely stored copy of the media content data on the cloud storage system;
identify a first media edit operation and a second media edit operation from the set of media operations to perform on the media content data;
determine which of the first media edit operation and the second media edit operation is a more computationally-intensive operation and which is a less computationally-intensive operation;
determine that the cloud storage system is reachable over a wide area network from the MCM device;
in response to determining that the cloud storage system is reachable over the wide area network and that available bandwidth does not exceed a threshold:
perform both the first media edit operation and the second media edit operation locally; and
synchronize the locally stored copy of the media content data with the remotely stored copy of the media content data at a later time in response to available bandwidth exceeding the threshold; and
in response to determining that the cloud storage system is reachable over the wide area network and that available bandwidth exceeds the threshold:
perform the more computationally-intensive operation on the remotely stored copy of the media content data on the cloud storage system;
perform the less computationally-intensive operation on the locally stored copy of the media content data; and
queue a synchronization operation for synchronizing the media content data on the cloud storage system, the synchronization operation comprising:
determining differences between the locally stored copy and the remotely stored copy of the media content data;
generating instructions to cause the cloud storage system to modify the remotely stored copy of the media content data to match the locally stored copy; and
transmitting the generated instructions to the cloud storage system, without sending the locally stored copy of the media content data.

* * * * *